United States Patent
Daspit et al.

(10) Patent No.: US 6,971,021 B1
(45) Date of Patent: Nov. 29, 2005

(54) NON-WIRE CONTACT DEVICE APPLICATION FOR CRYPTOGRAPHIC MODULE INTERFACES

(75) Inventors: John Ignatius Daspit, Rancho Palos Verdes, CA (US); Michael Masaji Furusawa, Chino Hills, CA (US); Chieu The Nguyen, Irvine, CA (US)

(73) Assignee: Rainbow Technologies, Inc., Irvine, CA (US)

( * ) Notice: Subject to any disclaimer, the term of this patent is extended or adjusted under 35 U.S.C. 154(b) by 0 days.

(21) Appl. No.: 09/520,589

(22) Filed: Mar. 8, 2000

(51) Int. Cl.[7] .................. G06F 11/30; H04L 5/16
(52) U.S. Cl. .............. 713/192; 713/159; 713/172; 713/193; 375/220
(58) Field of Search .............. 380/25, 21, 283; 342/44; 343/726; 340/572.1, 825.69; 235/472, 379, 380; 713/192, 159, 172; 375/220; 386/46

(56) References Cited

U.S. PATENT DOCUMENTS

| | | | |
|---|---|---|---|
| 5,053,774 A | * 10/1991 | Schuermann et al. | 340/10.34 |
| 5,230,088 A | 7/1993 | Kramer, Jr. et al. | |
| 5,572,226 A | * 11/1996 | Tuttle | 343/726 |
| 5,629,981 A | * 5/1997 | Nerlikar | 713/168 |
| 5,640,002 A | * 6/1997 | Ruppert et al. | 235/462.46 |
| 5,778,071 A | * 7/1998 | Caputo et al. | 713/159 |
| 6,028,935 A | * 2/2000 | Rarity et al. | 380/256 |
| 6,091,343 A | * 7/2000 | Dykema et al. | 340/825.69 |
| 6,282,362 B1 | * 8/2001 | Murphy et al. | 386/46 |
| 6,289,104 B1 | * 9/2001 | Patterson et al. | 380/283 |
| 6,593,853 B1 | * 7/2003 | Barrett et al. | 340/572.1 |

FOREIGN PATENT DOCUMENTS

EP  1 132 800 A2  9/2001

OTHER PUBLICATIONS

Article from Website, http://www.mobil.com/speedpass/html/questions.html,"Mobil Speedpass: Frequently Asked Questions", pp. 1–4, Oct. 14, 1999.

* cited by examiner

*Primary Examiner*—Emmanuel L. Moise
(74) *Attorney, Agent, or Firm*—Gerald T. Bodner

(57) ABSTRACT

Non-contact interfaces to cryptographic modules include non-contact inputs, which may contain magnetic coupling, RF coupling, infrared coupling, optical coupling or acoustical coupling to load cryptographic data into cryptographic modules. By using non-contact methods of coupling, the physical inputs to the module can be hidden, as no external connectors to input cryptographic data are required. In addition, several non-contact inputs can be disposed within a cryptographic module, at orientations and spacings which require the specific placement of transmitting units, thereby increasing the security of the module. In addition, by having several inputs to the cryptographic module, the cryptographic function may be made to be dependent on a sequencing of data between the inputs and/or may require simultaneous inputs on two or more sensors.

60 Claims, 11 Drawing Sheets

NON-WIRE CONTACT DEVICE APPLICATION FOR CRYPTOGRAPHIC MODULE INTERFACES

BACKGROUND OF THE INVENTION

1. Field of the Invention

The present invention relates, generally, to electronic cryptographic module interfaces, and more particularly to cryptographic module interfaces, which enhance security through the use of non-physical contact interfaces.

2. Description of Related Art

Transactions involving electronic systems are becoming increasingly more commonplace. Transactions involving money transfers, automated teller machines, and purchases over the Internet, and all manner of data processing are becoming pervasive and commonplace. Because the volume of electronic transactions of every type are ever increasing, there is more opportunity for fraud and unauthorized transfers to occur, and so it has become increasingly important to protect electronic systems from unauthorized access. A popular method of preventing unauthorized access of data processing systems is to employ the use of cryptographic modules. Cryptographic modules are electronic subsystems that provide cryptographic services for data processing applications. These services include, but are not limited to, encryption, decryption, authentication, certificate storage, cash value storage, and access control operations. Cryptographic modules are commonly either embedded in a host system or interfaced externally to a host system. The host system being the system that controls and/or passes data to or from the cryptographic module. The host system may be a desktop computer, portable computer, server, or any other processing equipment.

There are several different forms of cryptographic modules of differing size, power, and weight. All forms of cryptographic modules perform cryptographic services, but may differ markedly in their physical hardware appearances and in the applications in which they are present.

One type of cryptographic module is sometimes referred to as a cryptographic token. Cryptographic tokens comprise cryptographic security devices, which provide client services for host applications. Cryptographic tokens are commonly personal devices that are carried by their owner. When required, connecting the token to a host system accesses the token's services. Examples of tokens include Smart Cards, PC Card tokens (such as those using PCMCIA and CardBus), and USB tokens. Cryptographic tokens commonly plug into connections on the host system and can be freely installed or removed from the host system, but may also be coupled to a host system by non contact methods such as radio frequency (RF) coupling.

Another type of cryptographic module is the cryptographic plug-in circuit card. Cryptographic plug-in cards are installed into a host system and provide cryptographic services for the host system. Cryptographic plug-in cards commonly interface to the system on its local (internal) interface bus and are normally installed in the host system where the host interface is not externally accessible. Examples of cryptographic plug-in cards include ISA interface bus cards and PCI interface bus plug-in cards. Cryptographic plug-in cards may contain other peripheral interface functions such as Ethernet, SCSI, ADSL, RS-232, fire-wire, and others. Plug-in cards, generally, are intended to remain in the system over its life cycle and often require some disassembly of the host system to replace it.

Yet another type of cryptographic module is the stand-alone cryptographic module. Stand-alone cryptographic modules are commonly externally connected to the host system. Examples of stand-alone cryptographic modules include peripheral communications devices such as analog modems, digital modems, ADSL, Ethernet, fire-wire, external storage devices, RS-232, satellite terminals, and other forms of cryptographic security equipment.

Still another type of cryptographic module is the embeddable cryptographic module. Embeddable cryptographic modules are commonly assemblies and/or microcircuits that are integrated directly into a host system by incorporating them on a printed wiring board (PWB) or by connecting the cryptographic module to a PWB or processor in the host system. Embeddable modules are usually not accessible from the outside of the host system and often require disassembly of the host system to replace the embeddable module.

Cryptographic modules have at least one interface to their host system. This interface may transfer encrypted and decrypted data, configuration/initialization information, application software, cryptographic software and keys, control and status information as well as other information.

For security purposes, many cryptographic systems provide a separate data interface for the transfer of cryptographic information into the cryptographic module. This type of interface may be referred to as a Cryptographic Load Interface (CFI). The CFI is primarily used to transfer cryptographic information (such as private keys, certificates, and cryptographic software) securely into a cryptographic module, but can be used to transfer any type of information (such as application software updates) into the cryptographic module. Commonly CFI interfaces are receive only and do not output any data. The cryptographic load interface can be a variety of different types of transmitting units, for example radio, optical and magnetic, which are suitable to transmit cryptographic data.

One problem exhibited by conventional cryptographic interface implementations is that of physical concealment. Conventional electrical designs often require a metallic, hardware connector (pins or receptacles) for a host interface and/or CFI. Such connectors may be visible from the outside of the cryptographic module and can reveal a possible physical entry point into the cryptographic boundary of the host system, which can expose an avenue for extracting and compromising private information within the module. Efforts have been made to reduce the accessibility of the connector through conventional means, such as compartment doors or covers. Such concealment efforts however only reduce the visibility of the data port but fail to completely conceal it.

A second problem exhibited by conventional cryptographic interface implementations is that of susceptibility to cryptographic monitoring by electronic eavesdropping means. Conventional Input/Output (I/O) ports have physical pins that can be monitored for conductive and/or electromagnetic radiation thereby giving rise to the possibility of monitoring and deciphering critical information. The susceptibility of an interface to data monitoring depends on several factors related to the physical and mechanical implementation of the interface such as, connector, and cable shielding. Furthermore, it may be possible to induce a stimulus at an I/O interface and cause an internal failure within the module. An internal failure within the module may cause a denial of cryptographic services and can be as problematic as the unauthorized extraction of information.

There is also a possibility that the module, through error, internal failure or otherwise may inadvertently output protected information.

A third problem exhibited by conventional cryptographic interface implementations is that of susceptibility to interference. Conventional I/O ports can be susceptible to electromagnetic interference (EMI) or direct voltage induced into its connector and/or cabling. This may affect the modules' performance and may even defeat its security measures.

A fourth problem exhibited by conventional cryptographic interface implementations is that of susceptibility to the environment. Conventional I/O ports can be sensitive to extreme environmental conditions such as high temperature, radiation, and humidity that may damage or render the module's interface inoperable.

A fifth problem exhibited by conventional cryptographic interface implementations is that of cryptographic manufacturing requirements. Cryptographic security specifications may require complete physical tamper protection to be built around the module. The physical connectors often requires special designs that complicate and increase the cost of the installation and/or manufacturing of these tamper countermeasures.

A sixth problem exhibited by conventional cryptographic interface implementations is that of cryptographic field maintenance requirements. Cryptographic modules can require periodic maintenance based on their host system's security policy. At the end of a cryptographic period (which can range from days to years), the cryptographic module may need to be rekeyed to support further use. If a CFI is implemented, it may need to be accessible to load cryptographic parameters into the cryptographic module. If it is not accessible, then the host system may have to be disassembled to get to the CFI. Commonly, the cryptographic module is simply removed from the host and replaced. This replacement process can be inconvenient and can increase the overall life cycle costs of the system.

SUMMARY OF THE DISCLOSURE

To overcome the limitations in the prior art described above, and to overcome other limitations that will become apparent upon reading and understanding the present specification, the present invention relates, generally, to a non-wire contact cryptographic interface.

The present invention solves the above-described problems by providing an innovative and secure means for concealing a Cryptographic Load Interface (CFI) port, function and for preventing tampering with cryptographic parameters. A system in accordance with the principles of preferred embodiments of the present invention includes a one-way, wireless, receiver function based on magnetic, inductive, acoustic, radio frequency (RF), optical, or infrared technologies.

Other embodiments of a system, in accordance with the principles of the invention, may include alternative or optional additional aspects. One such aspect of the present invention is a one-way secure access protocol for protecting and authenticating incoming cryptographic data.

Other aspects of the invention include the use of a plurality of non-contact input Cryptographic Load Interface (CFI) ports. Such ports may comprise a multitude of similar type inputs, such as radio frequency sensors, or the CFI ports may comprise a combination of different types of inputs such as an acoustic sensor and a radio frequency sensor. The plurality of sensors may be used concurrently or in a predetermined order to provide a further secure Cryptographic Load Interface.

Other embodiments may encompass various other aspects of the present invention. For example, the Cryptographic Load Interface may be programmed to accept data packets of information containing various encryption parameters. The encryption may pertain to only the data packet in which they are encoded or they may pertain to a sequence of data packets. The data packets may contain such encryption information as which type of encryption file is to be used with the incoming data or a digital signature that could be compared with a digital signature file within the cryptographic module. The data packets might also contain cryptographic parameters such as private keys and digital signatures.

These and various other advantages and features of novelty, which characterize the invention, are pointed out with particularity in the claims annexed hereto and form a part hereof. However, for a better understanding of preferred embodiments of the invention, its advantages, and the advantages obtained by their use, reference should be made to the drawings, which form a further part hereof, and to accompanying descriptive matter. The drawings and accompanying descriptive matter illustrate and describe specific examples of apparatuses with aspects in accordance with the present invention.

These and other features, objects, and advantages of embodiments of the invention will be apparent to those skilled in the art from the following detailed description of embodiments of the invention, when read with the drawings and appended claims.

DETAILED DESCRIPTION OF PREFERRED EMBODIMENTS

In the following description of preferred embodiments, reference is made to the accompanying drawings which form a part hereof, and in which is shown, by way of illustration, specific embodiments in which the invention may be practiced. It is to be understood that other embodiments may be utilized and structural changes may be made without departing from the spirit and scope of the present invention.

Figure 1:
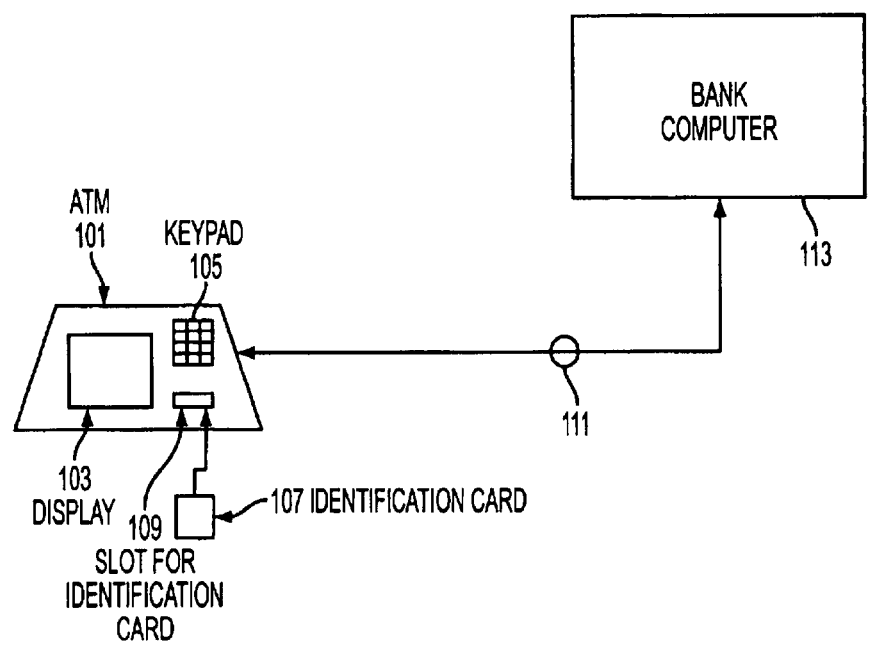
FIG. 1 is a graphic illustration of a an example environment in which a cryptographic token, such as an identification card, may be used.

FIG. 1 is a graphic illustration of an example system environment where a cryptographic token, such as an identification card, is used. FIG. 1 is a graphic depiction of the common ATM or automated teller machine. The automated teller machine 101 comprises a display 103 for displaying user prompts and customer messages, a keypad 105 and a slot for an identification card 109. An identification card 107 is inserted into the slot 109. A user then observes the display 103 entering a PIN (Personal Identification Number) on the keypad 105 in order to access the user's account. If the cryptographic data within the identification card and the keypad are suitable then the user can communicate with the bank computer 113 over an electronics communication line such as a telephone line or dedicated transmission line 111.

The ATM machine has become increasingly popular over the recent years. The ATM machine has several security weaknesses within its architecture. One weakness is that the identification card 107 that the user uses to identify himself can be lost or stolen and the user PIN number can also be misappropriated, such as by observing an authorized user entering the number on the keypad 105. In addition, the data link between the automated teller machine 101 and the bank computer 113 (i.e., 111) is subject to electronic eavesdropping.

If the electronic link 111 between the ATM machine and the bank computer is subjected to electronic eavesdropping measures, the data which is used to access a customer's account within the bank computer 113 may be intercepted. The data, which is used to access the customer's account, may used to withdraw money from the account without the customer's knowledge or authorization.

Figure 2:
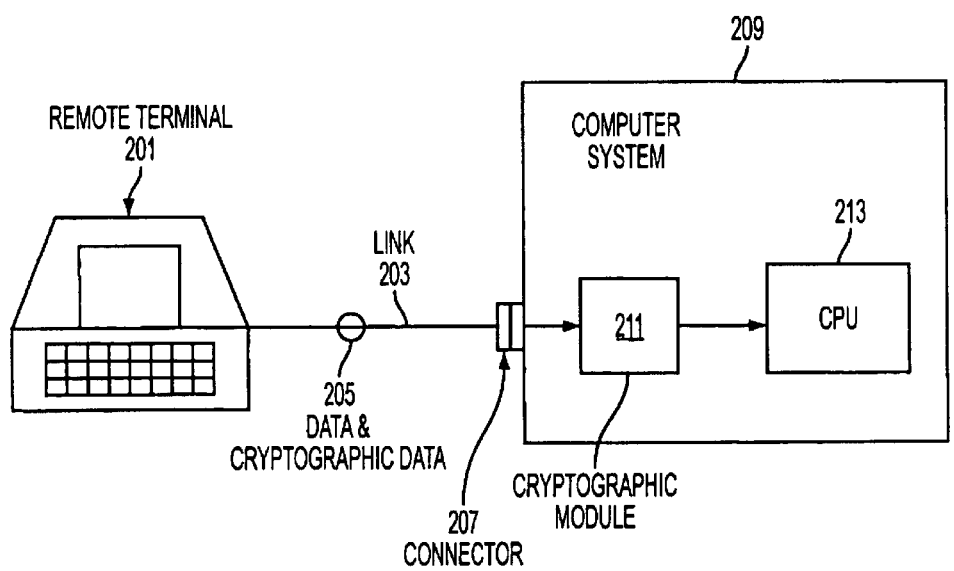
FIG. 2 is a graphic illustration of a computer system containing a cryptographic module.

FIG. 2 is a graphic illustration of a computer system containing a cryptographic module. In FIG. 2 a remote terminal 201 communicates via a link 203 with a computer system 209. Both data and cryptographic data flow across the link 203 into the connector 207 and are further coupled to a cryptographic module 211. The output of the cryptographic module 211 is coupled into a Central Processing Unit (CPU) 213 within the computer system 209. The cryptographic module 211 can be used to prevent unauthorized access through the computer system by inhibiting the passage of (or otherwise screening out) communications that do not contain the appropriate cryptographic data. In order to access the computer system 209, the remote terminal 201 must first communicate the proper cryptographic data across the link 203 to the computer system 209 in order to activate the cryptographic module 211. Although the computer system 209 cannot be accessed without the proper cryptographic data the system illustrated in FIG. 2 is still subject to unauthorized access by, for example, observing the data in the link 203 or by injecting signals into the computer system through the connector 207. The connector 207 provides an obvious entry into the computer system 209.

Figure 3:
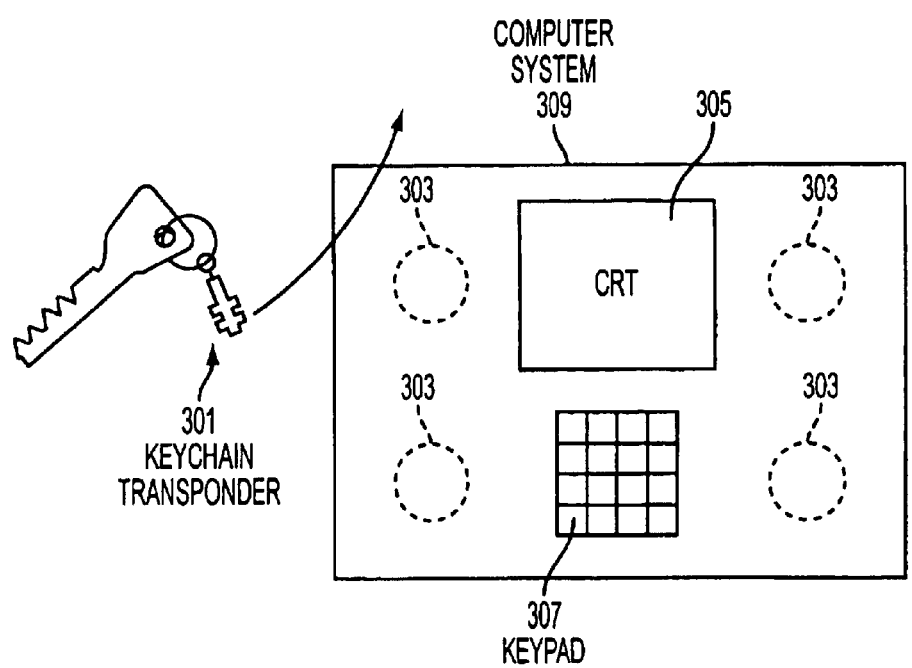
FIG. 3 is a graphical example of a non-contact identification token.

FIG. 3 is an example of a non-contact identification token. In FIG. 3 a keychain transponder 301 interacts with a computer system 309. The keychain transponder 301 is moved across an area where a radio frequency (RF) unit 303 activates the keychain transponder 301. The keychain transponder then provides an input to the RF unit 303 identifying the user to the computer system 309. The user may then interact with the system through a keypad 307 and a CRT 305. This type of system is similar to that used by the Mobil Oil Company in its Speed Pass application used to purchase gasoline. This type of cryptographic module system does away with some of the obvious avenues for unauthorized access present in FIG. 1 and FIG. 2. For example, the RF unit 303 used to activate the keychain transponder 301 can be hidden from view by a cover over the computer system 309. With a cover concealing the computer system there is then no obvious input to the system such as the connector 207 exhibited in FIG. 2 or the electronic data link 111 illustrated in FIG. 1. The system, however, emits radio waves from the transponder 303 which is then picked up by the keychain transponder 301 which then generates a radio frequency response signal identifying the user. Although the inputs to the computer system 309 are not obvious, the RF link between the keychain transponder and the computer system is still subject to electronic eavesdropping by receiving the RF signals from the RF unit 303 and the keychain transponder 301.

Figure 4:
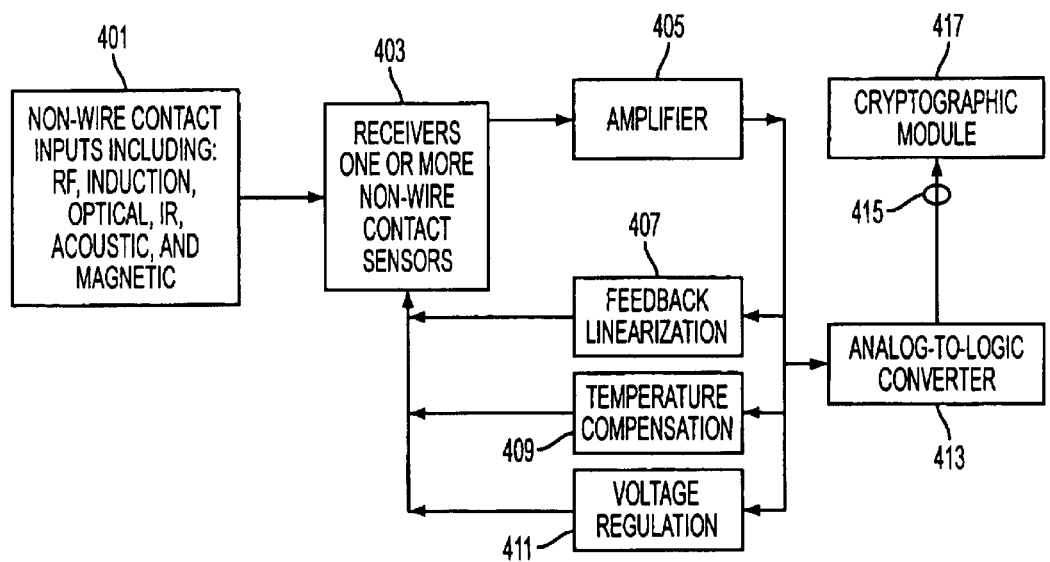
FIG. 4 is a block diagram of a non-wire contact cryptographic load interface (CFI).

FIG. 4 is a block diagram of a non-wire contact Cryptographic Load Interface (CFI). The non-wire contact implementation replaces a conventional I/O port design comprising wire contact interfaces. This CFI embodiment illustrates a means for securely and conveniently loading cryptographic information into modules. The cryptographic information that is loaded into the cryptographic module 417 comprises information for configuring the module for operation.

The cryptographic information that is loaded into the cryptographic module 417 may comprise a variety of different types of data. It may, for example, comprise algorithms for decoding information from a host system. It may also include authorization codes, initialization variables, encryption keys, authorization data, user identity data or any other data which is necessary to allow the cryptographic module 417 to perform the cryptographic function intended. The cryptographic data should be distinguished from the host data. Host data is data supplied to the cryptographic module in order for the cryptographic module to perform some cryptographic function, for example, decoding, on. Host data may be coupled to the cryptographic module 417 in an encrypted form and then returned to the host system in an unencrypted form once the cryptographic module 417 has been activated.

The term Cryptographic Load Interface (CFI) is a general term that describes a receive only interface employed for the purpose of inputting cryptographic and/or non information into cryptographic modules. Such non-wire contacts can be implemented using various designs. For example magnetic coupling, inductive coupling, acoustic coupling, optical coupling in particular infrared, and radio frequency coupling are possible. In addition to the non-wire coupling CFI an embodiment of the invention may include the implementation of a one-way Cryptographic Load Protocol (CLP). A CLP, provides a secure implementation for a CFI port.

With respect to FIG. 4, block 401 represents a non-wire contact input such as an RF induction, optical infrared (IR) acoustic, or magnetic coupling. As an example, a magnetic sensor or an integrated Hall effect circuit can be employed as a Cryptographic Load Interface (CFI). The magnetic sensor or Hall effect interface, in addition to being electronically more secure by providing a data coupling point that may be hidden from view, is significantly more immune to environmental contaminants and suitable for use under severe conditions. It can be completely contained within the case housing the system without exposure to the surrounding environment. By coupling the receivers with an amplifier 405 for amplifying the received signal, feedback linearization 407 for removing non-linearity in the input signal, temperature compensation 409 for compensating for temperature variation in components, and voltage regulation 411 to compensate for varying power supply voltages, the design can be tuned for selectivity and sensitivity. Additionally visible exposure of the CFI can be avoided. Because the CFI can be operated using a non-contact interface, for example, a magnetic field no physical connector is required, allowing complete concealment of the CFI from view. In addition, problems such as interference and cross-talk, which is exhibited by electronic lines, such as those illustrated in FIG. 1-111 and in FIG. 2-203, can be minimized.

Induction methods may alternatively be used to couple data into a cryptographic module 417. After the input from one or more non-contact sensors has been conditioned through the use of conditioning modules such as 405, 407, 409 and 411 the input may be converted by an analog to logic converter 413 into a suitable level signal 415 to be coupled into the cryptographic module 417.

Acoustic coupling methods, particularly high frequency coupling techniques (preferably, frequencies greater than the normal human hearing capability), can be employed in non-wire contact inputs. Miniature piezo-electric high frequency sensors and microphones can be used as receiving elements and can provide a unique and non-obvious concealed CFI port.

Optical methods, in particular infrared technologies, similar to methods in common use today for remote control of many entertainment and other electronic devices, can also be used to provide a non-wire contact input port. Infrared (IR) interfaces can remain completely concealed by using materials, which are transparent to IR and opaque to visible light, effectively concealing them when viewed by the human eye. The IR port can offer a convenient method of field programming a module without disassembly or removal from a host system.

Radio frequency methods of coupling can also be employed in CFI non-wire contact applications. Although radio frequency does have drawbacks associated with the implementation of an antennae (i.e., a radio frequency interface could possibly radiate protective cryptographic information even if only in a receiver function), radio frequency interfaces can also be employed as a non-wire connection. Reduced power, added shielding and coding techniques such as spread spectrum, can be employed to reduce possible signal radiation and opportunity for electronic eavesdropping.

A uni-directional (receive input only) cryptographic load protocol (CLP) allows the ability to set up a cryptographic module and parameters for loading operations but can minimize the possibility of sensitive data from leaking from the port. Because the receiver 403 is a receive-only mechanism the chance of eavesdropping via electronic radiation is diminished.

Figure 5:
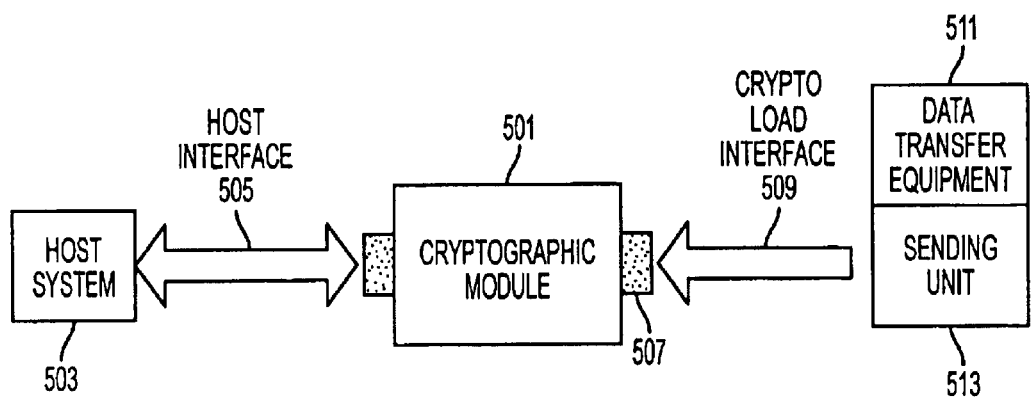
FIG. 5 is a block diagram of a cryptography module, which may be used with a cryptographic load interface (CFI).

FIG. 5 is a block diagram of a cryptography module, which may be used with a Cryptographic Load Interface (CFI). In FIG. 5 a cryptographic module 501 receives data from data transfer equipment 511 which is transmitted by a sending unit 513 using a non contact Cryptographic Load Interface 509. The Cryptographic Load Interface 509 may comprise a variety of different signal types such as, but not limited to, radio signals, induction signals, magnetic coupling signals, optical signals, acoustic signals, and infrared signals. Data can be carried by these signals through a variety of means well known in the art. The data sent by the sending unit 513 using the cryptographic load interface 509 is cryptographic data. Cryptographic type data is data that controls the functioning of the cryptographic module 501. Cryptographic data may comprise a variety of different types of data, Cryptographic data including, but not limited to, algorithms for decoding data from a host system 503. Cryptographic data may also include software keys for decrypting data, identification data for identifying authorized transactions and users of the system, various protocols for interacting with data from a host system 503, software updates or reauthorizations of the cryptographic module 501, or a variety of other types of data which enable the cryptographic module 501 to accomplish its cryptographic function. The cryptographic load interface 509 is a unidirectional interface transferring data from a sending unit to the cryptographic module only. In contrast, cryptographic services may be provided through a host system 503 via a host interface 505. A host interface 505 may be a bidirectional interface linking a host system 503 to the cryptographic module 501. The cryptographic module may provide a variety of cryptographic services to a host system 503. By way of example, a host system 503 may send encrypted data via a host interface 505 to a cryptographic module 501. The data may then be decoded in the cryptographic module 501 according to algorithms or protocols received by the cryptographic module from the cryptographic load interface 509. The cryptographic module may then decode the encrypted data from the host system 503 and return unencrypted data across the host interface 505 from the cryptographic module 501 to the host system 503. A host system 503 may also send across the host interface 505 data to the cryptographic module 501 which is then analyzed according to algorithms provided to the cryptographic module. The cryptographic module 501 can then return data to the host system 503 which is the result of applying algorithms to the data from the host system 503. For example, the host system may be providing data regarding a user to the cryptographic module 501. The cryptographic module may then examine the data according to algorithms received from the cryptographic load interface 509 and then return a simple authorization or no authorization for the particular transaction sent to it from the host system. Those skilled in the art will recognize that other suitable types of services provided by a cryptographic module 501 to a host system 503 and that the previous examples have been provided for illustration only. In other words, the cryptographic module will perform operations on data such as those from a host system 503 and may return data to the host system 503 across a bidirectional host interface 505. The same cryptographic module may receive cryptographic functioning information, such as data parameters and algorithms from a uni-directional cryptographic load interface 509. By separating the uni-directional cryptographic load interface 509 which couples data into the cryptographic module from the bidirectional host interface 505 across which client services is provided to the host system 503 by the cryptographic module 501, the possibility of unauthorized access to module functioning parameters from the cryptographic module 501 is greatly reduced.

In other embodiments the crypto load interface 509 may provide certain types of acknowledge signals to the sending unit 513. In such embodiments no crypto-information would be transmitted. The acknowledge signals would confirm that crypto-information was received and loaded correctly or may provide a command indicating that the information should be resent. The acknowledge or control signal might also be provided by a separate non-wire contact interface which could be located elsewhere on the unit.

The Cryptographic Load Interface 509 may comprise such inputs as RF induction, optical, IR, acoustic or magnetic radiations into a cryptographic module input 507. When cryptographic data is loaded into the cryptographic module 501 the host system 503 may then access the cryptographic module 501 through a host interface 505. After the data transfer from the Cryptographic Load Interface 509 has enabled the cryptographic module 501, the host system can then transfer host data via the host interface 505. The host interface 505 which may be, for example, a simple wire connection, in order to access the cryptographic functions of the cryptographic module 501. In other words, once the cryptographic module 501 has been loaded with the proper enabling data from the Cryptographic Load Interface 509 it can serve as a slave module to process data from the host system 503. By separating the cryptographic module input 507 from the bi-directional host interface 505, the likelihood that cryptographic data can be read from the input only cryptographic module input is greatly diminished over the case where the cryptographic module input 507 were used to output as well as input data. In the input only cryptographic module the ability to output data is not an inherent characteristic of input only ports.

Figure 6:
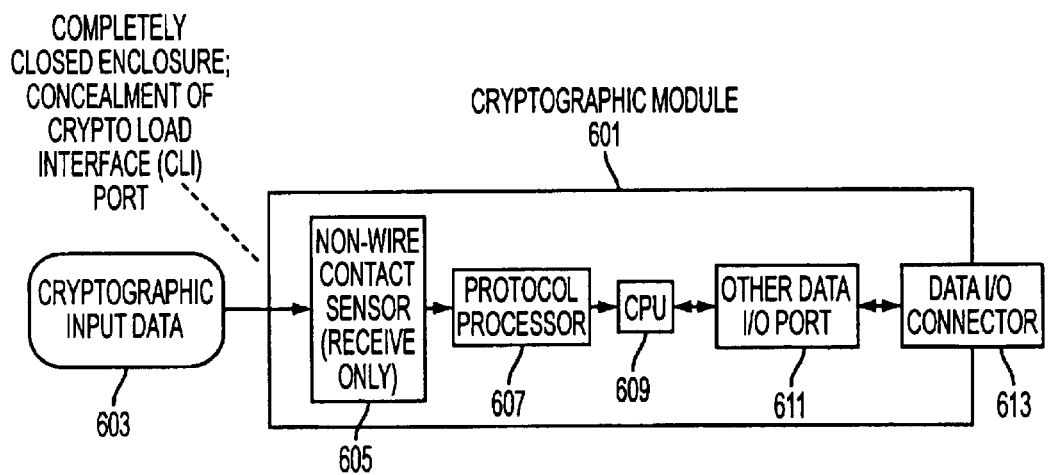
FIG. 6 is a block diagram of a cryptography module containing both a CFI interface and a Cryptography Load Protocol (CLP) within a block diagram illustrating a completely enclosed and concealed crypto-load interface.

FIG. 6 is a block diagram of a cryptography module containing both a CFI interface and a Cryptographic Load Protocol (CLP). The CLP allows the CPU 609 to perform cryptographic decoding functions only when loaded with the proper protocol, which has been received by the CFI. In FIG. 6 cryptographic input data 603 is provided to the cryptographic module 601, through a non-wire contact sensor 605 which may be of the receive only type. The sensor then provides data to a protocol processor 607, which then provides resulting data to the CPU 609, after verifying the protocol of the data within the protocol processor 607. Data then can be fed through a standard I/O connector 613, through an I/O port 611 to a CPU 609. The CPU 609 can then use the data provided to it by the protocol processor to decrypt data that it receives from the data I/O connector 613 through the data I/O port 611.

In other embodiments acknowledge signals may be provided by the non-wire contact sensor 605, or by another non-contact device, which can be located separate from non-wire contact sensor 605.

Such a scheme, as depicted in FIG. 6, has several advantages. A first advantage is that the cryptographic input data 603 may be coupled in a one-way direction into the cryptographic module 601 and into the non-wire contact sensor 605. A one-way coupling of data minimizes potential radiation from the cryptographic module which may be electronically eavesdropped. In addition, because there is no connection between the cryptographic input data and the data to be decoded, decoded data cannot be accessed through the cryptographic input.

Figure 7:
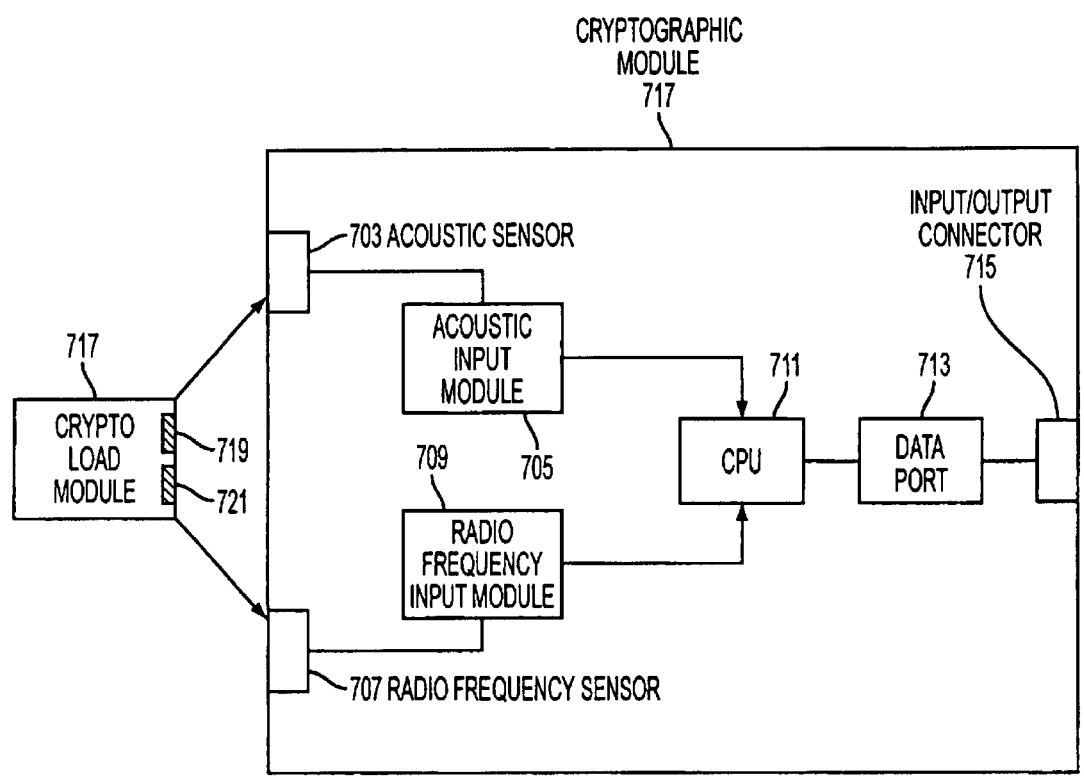
FIG. 7 is a graphic illustration of an enhanced security cryptographic module containing two non-contact CFI inputs.

FIG. 7 is a graphic illustration of a cryptographic module containing two non-contact CFI inputs, which may be used complimentarily for enhanced security. In FIG. 7 a cryptographic load module 717 contains two output transducers 719 and 721. Output transducer 719 is an acoustic output transducer and output transducer 721 is a radio frequency output transducer. An acoustic sensor 703 within the cryptographic module 717 receives the output of acoustic transducer 719. A radio frequency input sensor 707 within the cryptographic module 717 receives the output of the radio frequency transducer 721. The output of the radio frequency sensor 707 is coupled into a radio frequency input module 709 and from there into a CPU 711. In a like manner the acoustic sensor 703 couples its output into acoustic input module 705 and further couples the output from the acoustic input module 705 into the CPU 711. The CPU 711 may operate with a protocol, which is dependent on the inputs from both the acoustic sensor and the radio frequency sensor thereby heightening the security of the module. The cryptographic module 717 is similar to a cryptographic module 501 in that information from the Cryptographic Load Interface must be transferred into the CPU in order to enable the decoding action of the cryptographic module 717. In other words, CPU 711 must have information from both the radio frequency sensor 707 and the acoustic sensor 703 in order to decode the data which is coupled into it through I/O connector 715 into the CPU data port 713. The CPU 711 may depend, for its ability to decode input through the I/O connector 715, on both inputs from the radio frequency sensor and acoustic sensor simultaneously. Alternately, the CPU 711 may depend on both inputs which must contain a certain sequencing of data from the radio frequency sensor 707 and the acoustic sensor 703. For example, the CPU may be programmed so that it may not decode data unless it receives a first decoding key from the radio frequency sensor 707, a second decoding key from the acoustic sensor 703, followed by a third key from the radio frequency sensor 707 etc. In this way, sequencing between the sensors may be used to provide greater security within the cryptographic module 717.

By using more than one sensor protocols which require the reception of real time information simultaneously. In addition, the information may be differential information in which the data stream from a first device may be combined in some fashion with the data stream of one or more further devices in order to create the required cryptographic data.

The embodiment of FIG. 7 is applicable with different sensors and sensor combinations shown in the drawing, including, but not limited to, optical, magnetic, acoustic, and even multiple sensors of the same type. Example embodiments of sensor combinations include IR and magnetic combination or acoustic and magnetic combination. However, further embodiments may employ other suitable combinations of two or more sensors or sensor types.

Figure 8:
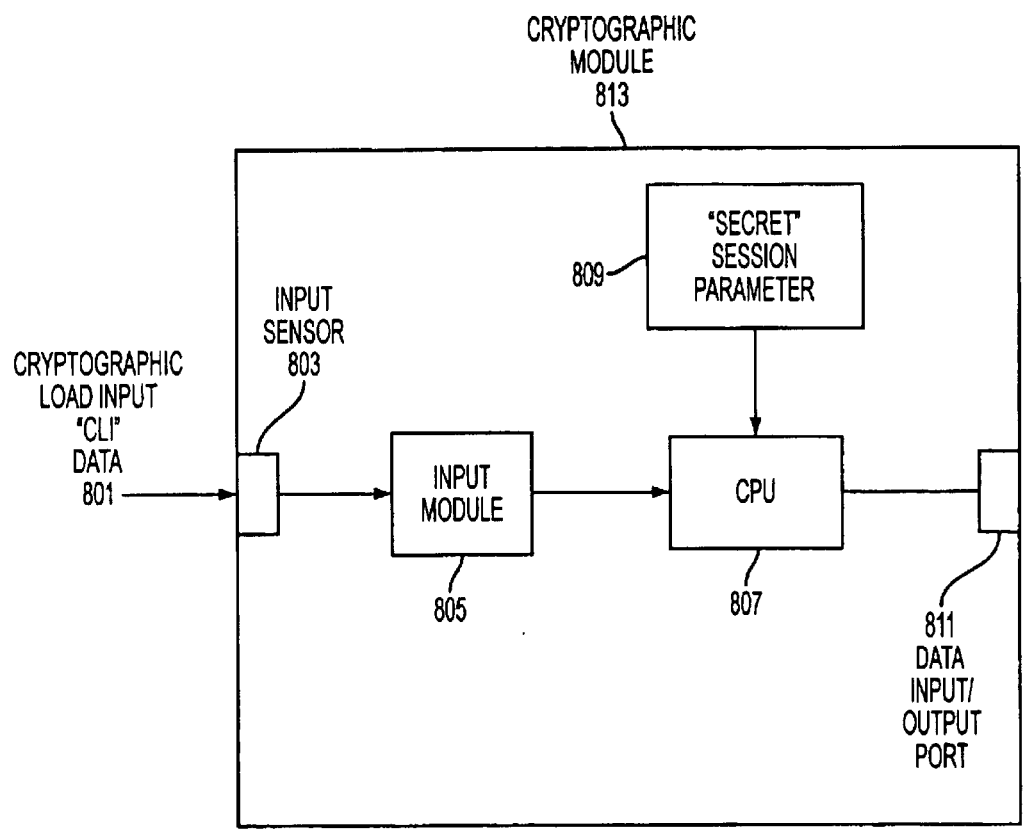
FIG. 8 is a graphic illustration of a cryptographic module having a non-contact CFI input as well as a "secret" session parameter.

Multiple sensor implementations can enhance physical security by defining a restricted area, specific orientation and location of the cryptographic module sensor inputs, thereby restricting the communication of cryptographic data. FIG. 8 is a graphical example embodiment of a cryptographic module with a specific orientation and location of cryptographic module inputs to enhance security.

Figure 11:
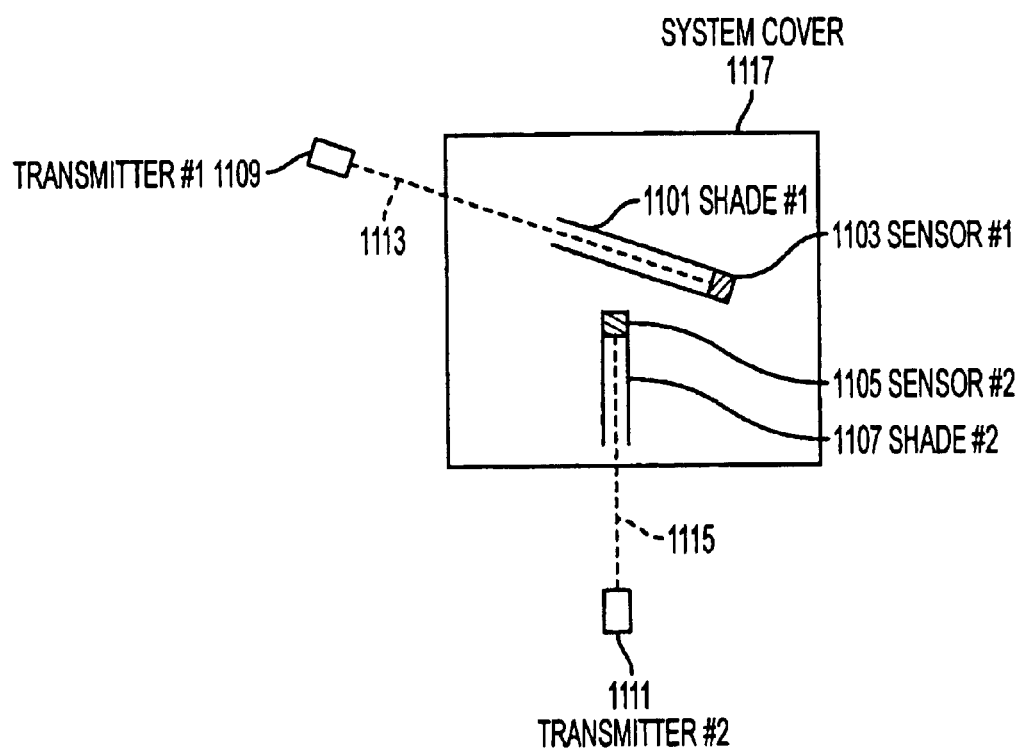
FIG. 11 is a graphical illustration of the use of specific an embodiment of the invention in which orientation and shielding of sensors are use to heighten security.

FIG. 11 is a graphical illustration of the use of specific an embodiment of the invention in which orientation and shielding of sensors are use to heighten security. In FIG. 11 a first transmitter 1109 transmits to a first sensor 1103. A first transmitter 1109 must be in a specific orientation because a first sensor 1103 is shielded by shade number one 1101, thus restricting the orientation of a first transmitter 1109. If a first transmitter 1109 deviates too far from a straight-line orientation 1113, then shade number one 1101 will prevent a first sensor 1103 from receiving transmissions from a first transmitter 1109. In the same manner, a second sensor 1105 receives transmissions from a second transmitter 1114 along a straight line path 1115. If a second transmitter 1111 deviates too far from the straight line path 1115 then shade number two 1107 will block the transmissions from a second transmitter 1111 and a second sensor 1105 will not receive the transmission from a second transmitter 1111. Only by placing a first transmitter and a second transmitter in the particular orientations shown can the sensors receive the data from the transmitters. An authorized user of the system would orient a first transmitter 1109 and a second transmitter 1111 with a particular orientation with respect to the system cover 1117. The transmitters, so aligned, would then be able to couple their transmissions into their respective sensors without being shielded by the respective shades.

By defining a restricted area and specific orientation the cryptographic input sensors, the transmitters that communicate with those inputs may be required to meet the restriction requirements and the specific orientation requirements of the receiving sensors. This physical characteristic and requirement of requiring a specific input location and orientation, in addition to the primary non-wire connection not being immediately obvious during an initial observation of the device, further enhances the security of the device.

FIG. 8 is a graphic illustration of a cryptographic module having a non-contact (CFI) input as well as a "secret" session parameter. The "secret" session parameter may comprise a decryption key that is to be used by the cryptographic module to provide cryptographic services to a host system. Secret session parameters can also be initialization parameters, supervisor keys, certificates, as well as other types of parameters. In FIG. 8 cryptographic fill input CFI data 801 is provided to an input sensor 803 within the cryptographic module 813. The sensed cryptographic fill input data is provided through the input sensor 803 into the input module 805. The input module then provides cryptographic data to the CPU 807. The cryptographic fill input data 801 may require a "secret" session parameter 809 that is to be used in decoding the data coupled into the module through the data input output port 811. The secret session parameter 809 can be provided to the CPU 807 and used with particular data supplied through the data input output port 811. In addition, secret session parameters can be provided via the data input output port 811. The cryptographic fill input may command that one "secret" session parameter be used. That "secret" session parameter 809 may have the ability to decode only one type of data provided by the data input output port 811. The cryptographic fill input data 801 may also command other secret session parameters 809 to be loaded into the CPU for use with other data streams which are provided to the data input output port 811. In this way, the cryptographic fill input must have knowledge of which "secret" session parameter must be chosen to decode the data provided to the cryptographic module. Several different data streams and several different "secret" session parameters 809 can be used together thereby enhancing security of the cryptographic module 813.

Figure 9:
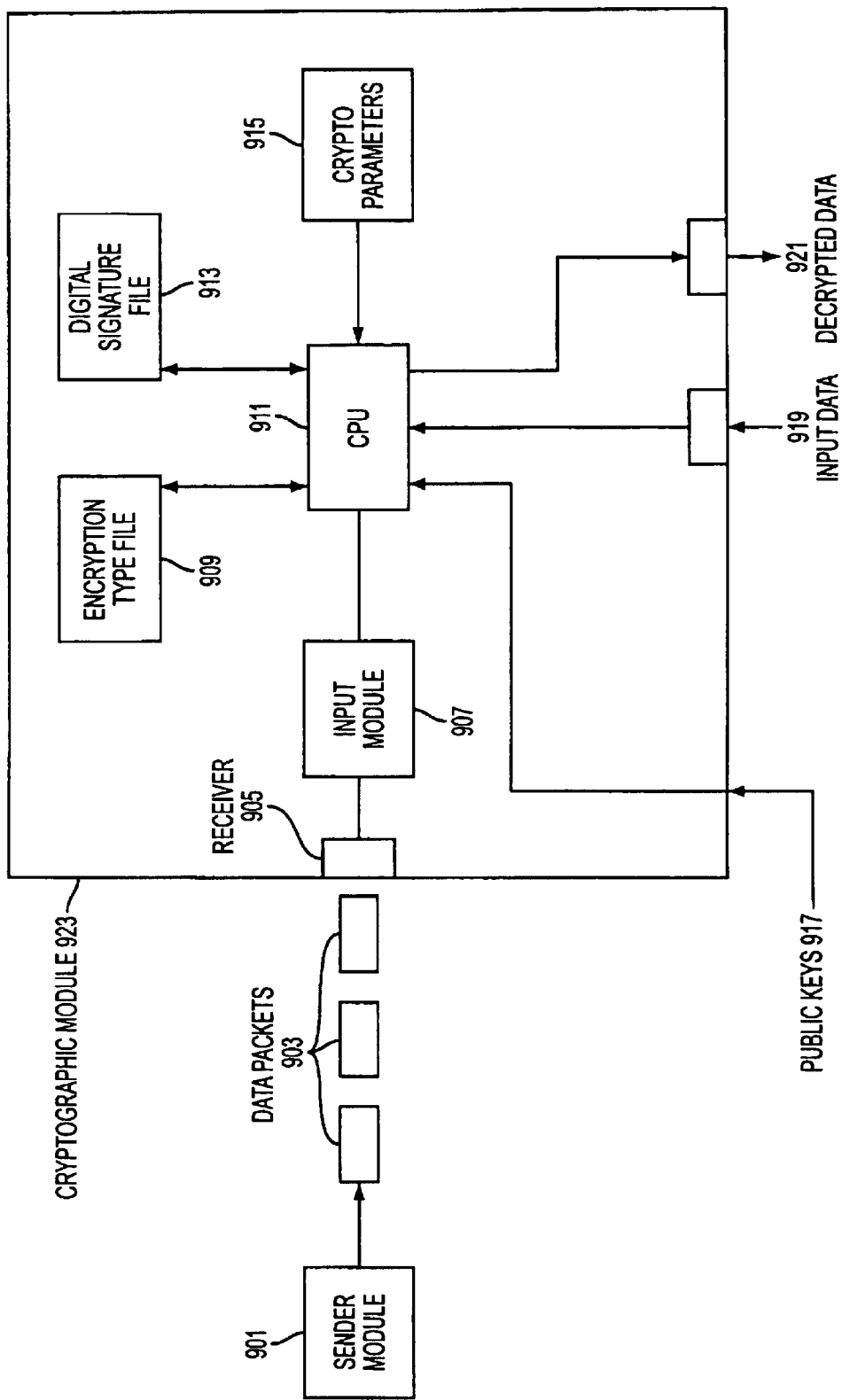
FIG. 9 is a graphic example of non-wire contact cryptographic module and system according to an embodiment of the invention, which employs a data packet, input scheme.

FIG. 9 is a graphic example of a non-wire contact embodiment of the invention, which employs a data packet input scheme. In FIG. 9 a cryptographic module 923 is designed to accept data packets 903 from a sender module 901. The sender module 901 sends data packets 903 to a receiver 905 within the cryptographic module 923. The receiver 905 further provides the data packets to an input module 907. The input module conditions and converts the input from the receiver 905 to readable form by the CPU 911. Within the data packets 903 can be specifications used with the cryptographic function of the module 923. For example, within the data packets a specific encryption type file 909 may be defined. The CPU 911 then can retrieve an encryption type file 909 as commanded by the data in the data packets 903. Also, the data packets 903 may specify a digital signature file. The data packets 903 may need to have the correct data signature file to activate the CPU 911 and its decoding function. The data packets 903 can also specify other types of cryptographic parameters 915 to be input into the CPU. The data packets 903 may contain pointers to cryptographic parameter files 915 or may contain the actual cryptographic parameters. In addition, data from the data packets 903 may contain private keys that are then used within the CPU in concert with public keys 917, which have been coupled from the outside environment into the cryptographic model 923. By using these various parameters, the CPU may be commanded to use various schemes of decryption on the input data and may then provide decrypted data to the decrypted data port 921.

Figure 10:
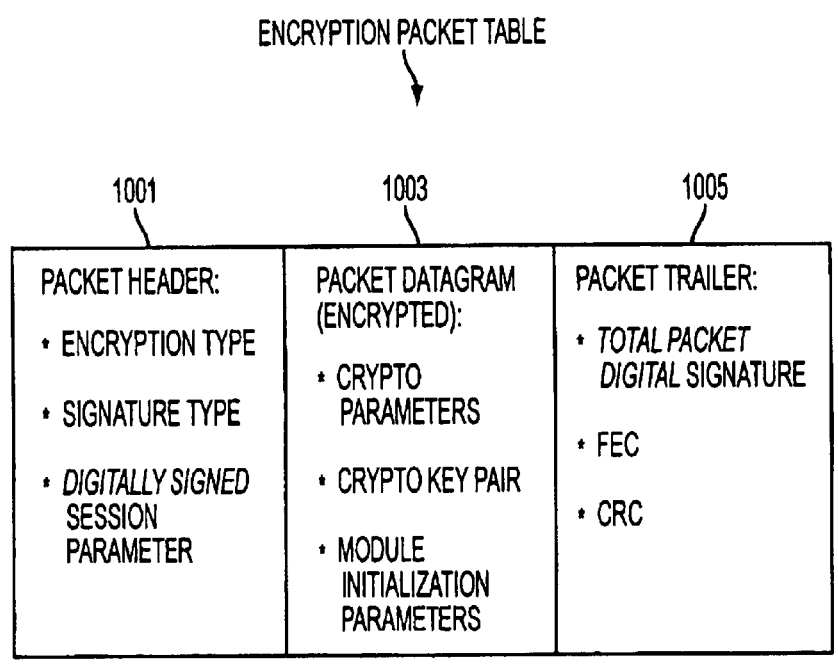
FIG. 10 is a table illustrating an example embodiment of a data packetization protocol as may be used with embodiments of the invention such as that illustrated in FIG. 9.

FIG. 10 is a table illustrating an example embodiment of a data packetization protocol as may be used with non-wire contact embodiments of the invention such as that illustrated in FIG. 9. In FIG. 10 the encryption packet table specifies the composition of the data packets such as the data packets 903 illustrated in FIG. 9. The illustrative data packets may consist of three different portions: a packet header 1001, a packet datagram 1003, which may be encrypted, and a packet trailer 1005. The packet header 1001 may include such information as the encryption type to be used, the signature type to be used inside the module, and may contain an authentication such as a digital session parameter. The packet diagram 1003 may further contain cryptographic parameters, cryptographic key pairs, and module initialization parameters. The packet trailer may comprise a total packet digital signature, a forward error correcting code or a Cyclic Redundancy Code (CRC) code thereby enhancing the security of the data packets themselves.

By encrypting the data within a packet, various schemes may be used to further enhance data security. For example, a packet header may specify an encryption type that is to be used with that particular packet. A second encryption packet may specify a different encryption type for the packet thereby necessitating a different type of decryption for that packet. In other words, each data packet can support its own protocol session parameters, encryption types, error correcting code, and CRC codes. In addition, one packet may contain error-correcting codes for successive packets. In this way, data packets may be mixed and matched thereby increasing the difficulty in decoding a data package stream.

The foregoing description of the exemplary embodiment of the invention has been presented for the purposes of illustration and description. It is not intended to be exhaustive or to limit the invention to the precise form disclosed. Those skilled in the art will recognize that the disclosed technology is applicable to a variety of applications differing from those illustratively disclosed. Many modifications and variations are possible in light of the above teaching. It is intended that the scope of the invention be limited not with this detailed description, but rather by the claims appended hereto.

What is claimed is:

1. An apparatus for providing cryptographic services to a host, the apparatus comprising:
    at least one non-contact cryptographic data receiver for receiving cryptographic data through at least one non-contact interface, the cryptographic data for use to provide at least one cryptographic service on separate host data;
    a host data receiver different from the at least one non-contact cryptographic data receiver, for receiving host data from a host; and a central processing unit (CPU) having memory and programming for receiving cryptographic data from the at least one cryptographic data receiver and host data from the host data receiver and processing said data to provide at least one cryptographic service using said cryptographic data on the host data to produce output data.

2. An apparatus as in claim 1, wherein the at least one non-contact cryptographic data receiver comprises a non-contact receiver chosen from the group consisting of:
a magnetic receiver, a radio frequency receiver, an optical receiver, an infrared receiver, an ultrasonic receiver, and an induction receiver.

3. An apparatus as in claim 1 wherein each of the at least one non-contact interfaces is a receive only interface.

4. An apparatus as in claim 1, further comprising a housing separate from the host, the housing containing the CPU, the at least one non-contact cryptographic data receiver, the at least one non-contact interface and the host data receiver, wherein the at least one non-contact interface is hidden from view from outside of the housing.

5. An apparatus as in claim 1, wherein the at least one non-contact receiver is directional, capable of receiving only a directionally restricted input.

6. An apparatus as in claim 5, wherein the directionally restricted input is accomplished by an orientation of the non-contract cryptographic data receiving sensor.

7. An apparatus as in claim 5 wherein the directionally restricted input of the non-contract cryptographic data receiving sensor is accomplished by shielding the non-contact sensor.

8. An apparatus as in claim 1, wherein the host interface is coupled to the host data receiver for providing host data from the host to the receiver, the host interface being separate from the non-contact interface.

9. An apparatus as in claim 1, wherein the cryptographic data comprises at least one algorithm and wherein providing at least one security service on host data comprises applying the algorithm to the host data.

10. An apparatus as recited in claim 9, wherein said algorithm comprises a decryption algorithm and said output data comprises a decrypted version of the host data.

11. An apparatus as recited in claim 1, wherein the at least one non-contact cryptographic data receiver comprising a plurality of non-contact cryptographic data receivers, each non-contact cryptographic data receiver for receiving cryptographic data through a respective non-contact interface.

12. An apparatus as in claim 11, wherein the plurality of non-contact cryptographic data receivers further comprise non-contact receivers chosen from the group consisting of:
magnetic receivers, radio frequency receivers, optical receivers, infrared receivers, ultrasonic receivers and induction receivers.

13. An apparatus as in claim 11, wherein said plurality of non-contact cryptographic data receivers are receive-only interfaces.

14. An apparatus as in claim 11, further comprising a housing separate from the host, the housing containing the CPU, each non-contact cryptographic data receiver, each non-contact interface and the host data receiver, wherein each non-contact interface is hidden from view from outside of the housing.

15. An apparatus as in claim 11 wherein the plurality of non-contact receivers can receive only restricted directional input.

16. An apparatus as in claim 15 wherein the reception of directional input is accomplished by the orientation of the sensors.

17. An apparatus as in claim 15, wherein the reception of directional input is accomplished by shielding the sensors.

18. An apparatus as recited in claim 1, wherein the at least one non-contact cryptographic data receiver comprises a plurality of spatially separated non-contact cryptographic receivers and wherein the CPU programming includes programming for receiving a plurality of different cryptographic data from the plurality of non-contact cryptographic data receivers, respectively, in a predetermined sequence.

19. An apparatus as recited in claim 1, wherein the at least one non-contact cryptographic data receiver comprises a plurality of spatially separated non-contact cryptographic receivers for receiving a plurality of different cryptographic data in a predetermined sequence, and wherein the CPU programming includes programming for processing data to provide at least one cryptographic service only if the plurality of different cryptographic data is received by the receivers in the predetermined sequence.

20. An apparatus as recited in claim 1, wherein the at least one non-contact cryptographic data receiver comprises a plurality of spatially separated non-contact cryptographic receivers, each non-contact cryptographic receiver having means for restricting the range of directions from which data may be received to a defined receive direction range and wherein the receive direction range for each of the receivers is different from the receive direction range of at least one of the other receivers in the plurality of receivers.

21. An apparatus as in claim 1, further comprising a host interface for accepting said output data and providing said output data to the host.

22. A security module for providing security services, the security module comprising:
at least one non-contact interface for receiving security data to use to provide at least one security service on separate host data;
a host interface different from the at least one non-contact interface, the host interface for receiving host data from a host computing system;
a processor configured to provide said at least one security service using said security data on the host data.

23. A module as recited in claim 22, wherein the security data comprises an algorithm and wherein providing at least one security service on host data comprises applying the algorithm to the host data.

24. A module as recited in claim 23, wherein providing at least one security service further comprises producing result data from the application of the algorithm to the host data and returning the result data to the host computing system.

25. A module as recited in claim 24, wherein said algorithm comprises a decryption algorithm and said result comprises a decrypted version of the host data.

26. A module as recited in claim 22, wherein said non-contact interface comprises a unidirectional, receive-only interface.

27. A module as recited in claim 26, wherein said host interface comprises a bi-directional interface.

28. A module as recited in claim 26, wherein said non-contact interface is hidden from view.

29. A module as recited in claim 22, wherein said host interface comprises a bi-directional interface.

30. A module as recited in claim 22, wherein said host interface comprises a port that is accessible and viewable from outside of the module.

31. A module as recited in claim 22, further comprising a housing separate from the host computing system, the housing containing said processor, wherein said non-contact interface is located within the housing and hidden from view from outside of the housing.

32. A module as recited in claim 22, further comprising a housing separate from the host computing system, wherein:
said processor and said non-contact interface are located within the housing;
said non-contact interface is hidden from view from outside of the housing; and
said host interface comprises a port that is accessible and viewable from outside of the housing.

33. A module as recited in claim 22, wherein the at least one non-contact interface comprises a plurality of non-contact interfaces, each for receiving security data to use to provide at least one security service on separate host data.

34. A module as recited in claim 33, wherein the processor is further configured to provide the at least one security service if a plurality of different security data is received through the plurality of non-contact interfaces, respectively, in a predetermined sequence.

35. A module as recited in claim 33, wherein each of the non-contact interfaces has means for restricting the range of directions from which data may be received to a defined receive direction range and wherein the receive direction range for each of the non-contact interfaces is different from the receive direction range of at least one of the other non-contact interfaces in the plurality of non-contact interfaces.

36. A process for providing security services, comprising:
receiving security data through at least one non-contact interface, the security data for use in providing at least one security service on separate host data;
receiving host data from a host computing system through a host interface that is different from said non-contact interface; and
providing said at least one security service using said security data on host data received from a host computing system.

37. A process as recited in claim 36, wherein the security data comprises an algorithm and wherein providing at least one security service on host data comprises applying the algorithm to the host data.

38. A process as recited in claim 37, wherein providing at least one security service further comprises producing result data from the application of the algorithm to the host data and returning the result data to the host computing system.

39. A process as recited in claim 38, wherein said algorithm comprises a decryption algorithm and said result comprises a decrypted version of the host data.

40. A process as recited in claim 36, wherein said non-contact interface comprises a unidirectional, receive-only interface.

41. A process as recited in claim 40, wherein said host interface comprises a bi-directional interface.

42. A process as recited in claim 40, wherein said non-contact interface is hidden from view.

43. A process as recited in claim 36, wherein said host interface comprises a bi-directional interface.

44. A process as recited in claim 36, wherein said host interface comprises a port that is accessible and viewable from outside of the module.

45. A process as recited in claim 36, wherein said processor and said non-contact interface are contained within a housing that is separate from the computing system, the non-contact interface being hidden from view from outside of the housing.

46. A process as recited in claim 36, wherein said processor and said non-contact interface are located within a housing that is separate from the computing system, the non-contact interface being hidden from view from outside of the housing and wherein said host interface comprises a port that is accessible and viewable from outside of the module.

47. A process as recited in claim 36, wherein receiving security data through at least one non-contact interface comprises receiving security data through a plurality of non-contact interfaces.

48. A process as recited in claim 47, wherein providing the at least one security service comprises providing the at least one security service if a plurality of different security data is received through the plurality of non-contact interfaces, respectively, in a predetermined sequence.

49. A module as recited in claim 47, wherein receiving security data through a plurality of non-contact interfaces comprises restricting the range of directions from which data may be received by each non-contact interface to a defined receive direction range and wherein the receive direction range for each non-contact interface is different from the receive direction range of at least one of the other non-contact interfaces in the plurality of non-contact interfaces.

50. A security system for providing security services on host data, the security system comprising:
a security module having at least one non-contact interface for receiving security data to use to provide at least one security service on separate host data, a host interface different from the at least one non-contact interface for receiving host data, and a processor configured to provide said at least one security service using said security data on the host data; and
a load module having at least one non-contact output port for providing security data to the at least one non-contact interface of the security module.

51. A security system as recited in claim 50, wherein the at least one non-contact interface comprises a plurality of non-contact interfaces.

52. A security system as recited in claim 50, wherein the at least one non-contact interface comprises a plurality of non-contact interfaces and wherein the at least one non-contact output port comprises a plurality of non-contact output ports, each of the non-contact output ports for providing security data to a respective one of the non-contact interfaces.

53. A security system as recited in claim 50, further comprising a host computing system coupled in communication with the host interface of the security module, for providing host data to the security module.

54. A security system as recited in claim 53, wherein the security module comprises a housing separate from the computing system and wherein said processor and said non-contact interface of the security module are contained within the housing, the non-contact interface being hidden from view from outside of the housing.

55. A security module for providing security services on host data, the security module comprising:
at least one receiver for receiving two different communications of information;
a processor operatively coupled to the receiver and configured for employing at least a portion of each of the two communications of information to produce security data and for providing at least one security service, using the security data on the host data.

56. A security module as recited in claim 55, further comprising at least two inputs for receiving the at least two different communications of information, each input for receiving a separate communication of information.

57. A security module as recited in claim 56, wherein at least one of the at least two inputs comprises a non-contact input.

58. A security module as recited in claim 56, wherein each of the at least two inputs comprises a non-contact input.

59. A security module as recited in clam 56, wherein a first one of the two communications of information comprises a communication of a first decoding key, wherein the second one of the two communications of information comprises a communication of a second decoding key, and wherein the host data may be decoded by combining the first and second decoding keys and applying the combination in a decoding process.

60. A security module as recited in claim 56, wherein a first one of the two communications of information comprises a communication of first cryptographic data, wherein the second one of the two communications of information comprises a communication of second cryptographic data, and wherein the host data may be processed by combining the first and second cryptographic data and applying the combination in a security process.

* * * * *